(12) United States Patent
Carrig

(10) Patent No.: US 6,665,443 B1
(45) Date of Patent: Dec. 16, 2003

(54) ROBUST ENCODED DOMAIN PIXEL DECODING

(75) Inventor: James J. Carrig, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 486 days.

(21) Appl. No.: 09/724,738

(22) Filed: Nov. 28, 2000

(51) Int. Cl.⁷ .............................. G06K 9/36; G06K 9/46
(52) U.S. Cl. ..................... 382/233; 382/260; 382/309
(58) Field of Search .................. 382/233, 248, 382/260, 261, 275, 309; 348/425.2; 375/240.27

(56) References Cited

U.S. PATENT DOCUMENTS 5,450,506 A * 9/1995 Gillard et al. ............. 382/309
6,327,307 B1 * 12/2001 Brailean et al. ......... 375/240.29
6,438,267 B1 * 8/2002 Kondo et al. ............... 382/238

* cited by examiner

Primary Examiner—Phuoc Tran
(74) Attorney, Agent, or Firm—Blakely, Sokoloff, Taylor & Zafman LLP (57) ABSTRACT

A method and apparatus for robust encoded domain pixel decoding is disclosed. In one embodiment, robust encoded domain pixel decoding includes receiving transform domain coefficients, and identifying erroneous coefficients. Then, for each erroneous pixel resulting from erroneous coefficients, a virtual tap is determined. For each virtual tap, transform domain coefficient dependencies are determined. A filter to estimate a value for the erroneous pixel is determined using the corresponding undamaged transform domain coefficient dependencies.

15 Claims, 12 Drawing Sheets

(A) ORIGINAL RECONSTRUCTION (B) DIRECT RECONSTRUCTION

ROBUST ENCODED DOMAIN PIXEL DECODING

FIELD OF INVENTION

The present invention is related to the field of image processing.

BACKGROUND OF THE INVENTION

Conventional image compression techniques, such as JPEG 2000, use subband transform domain coding. Pyramid coding is a similar technique where a small version of the image is used to predict a larger version and the residual errors are tracked. Though good for compression, these methods are usually considered fragile in the presence of errors.

Figure 1:
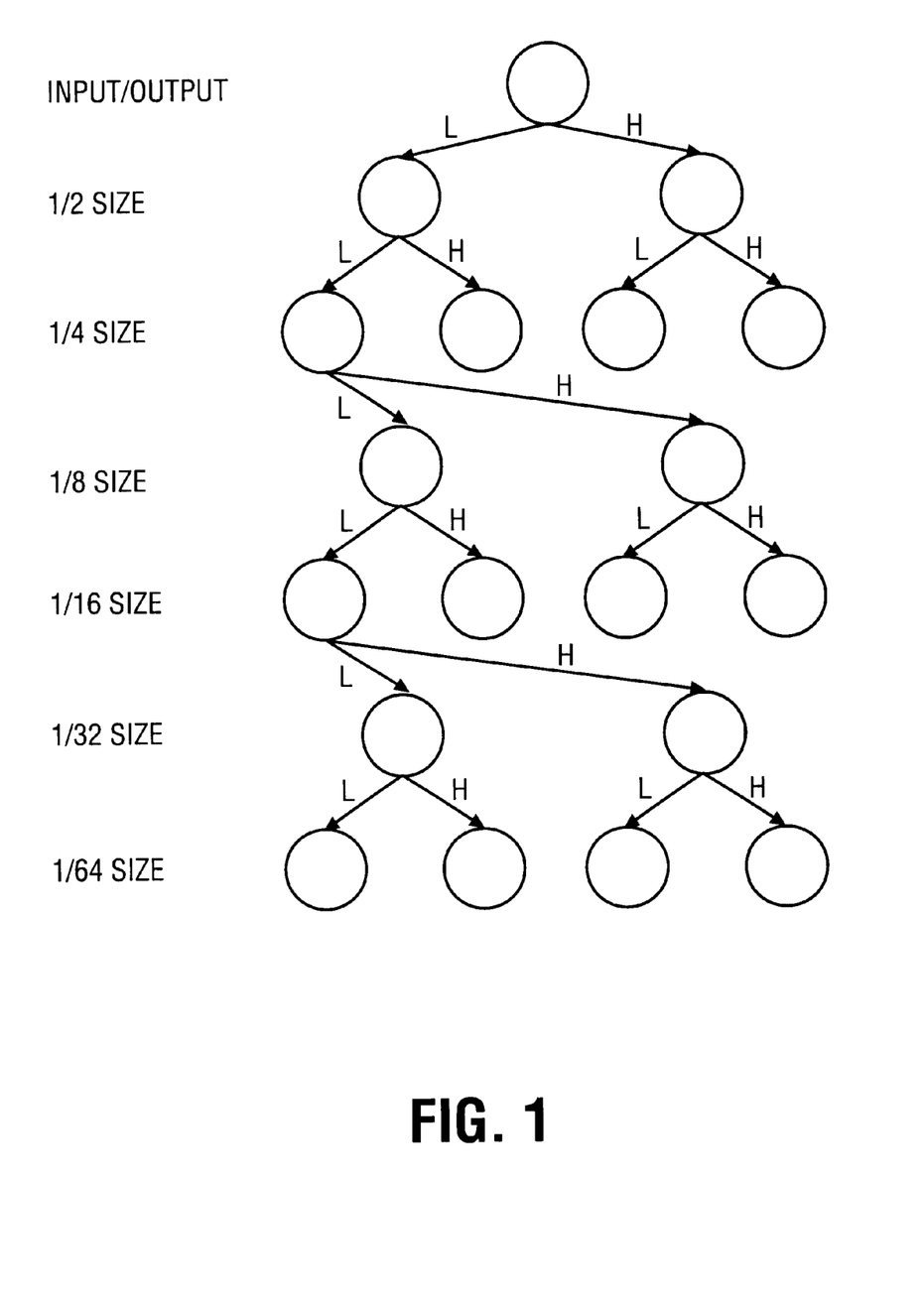
FIG. 1 shows an example of decomposition dependencies for a 3-level subband decomposition (resulting in a 1/64 size anchor image).
Figure 2:
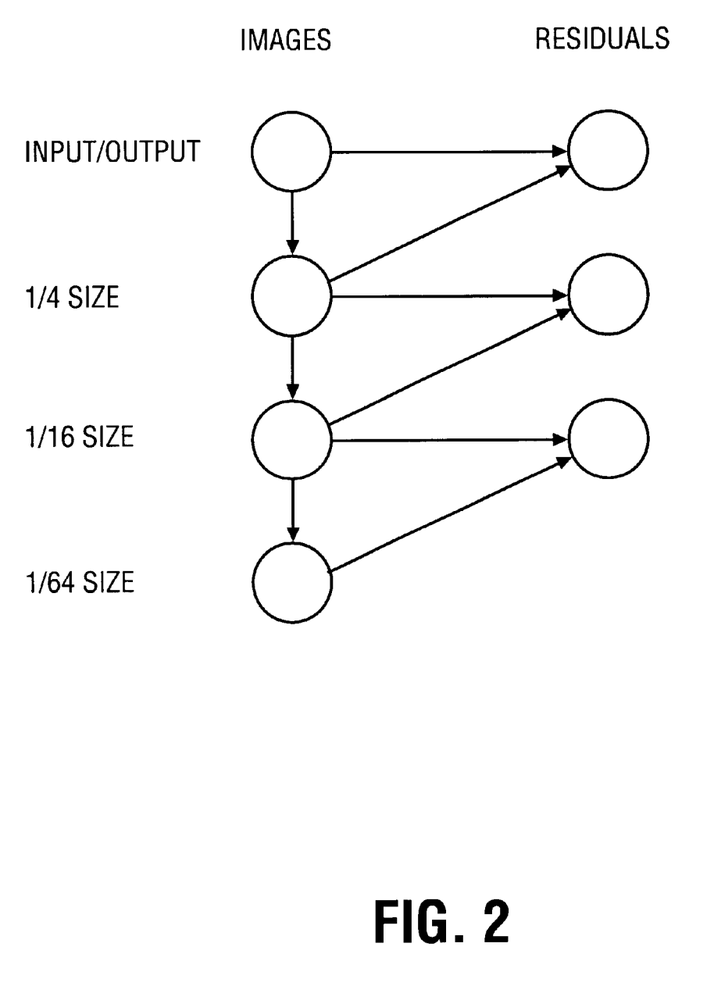
FIG. 2 shows an example of decomposition dependencies for a 4-level pyramid decomposition (resulting in a 1/64 size anchor image).

FIGS. 1 and 2 show dependency graphs for typical subband and pyramid decompositions. FIG. 1 the branches are labeled either L or H to indicated low-pass or high-pass coefficients respectively. FIG. 2 sorts the decomposition into images and residuals. Each small image is obtained by low-pass filtering and down sampling the larger image. This indicated by the L in FIG. 2. Residual images are formed by differencing the larger image from its prediction based on the smaller image, as shown in FIG. 2. Coding systems that use the structures depicted in FIGS. 1 and 2 transmit only the "leaves" of the graphs. That is, only those coefficients corresponding to nodes that have no outgoing arrows are transmitted.

Figure 3:
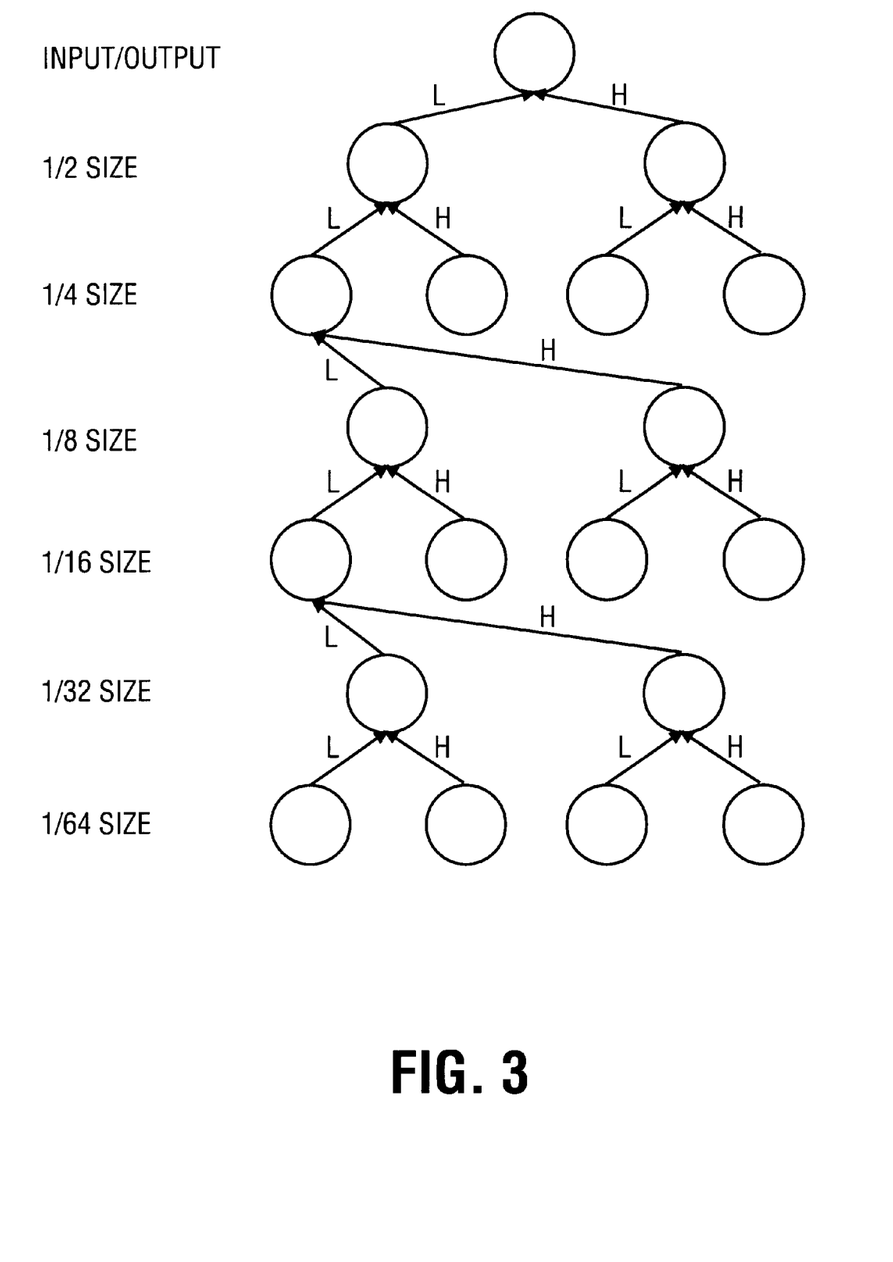
FIG. 3 shows an example of reconstruction dependencies for a 3-level subband decomposition.
Figure 4:
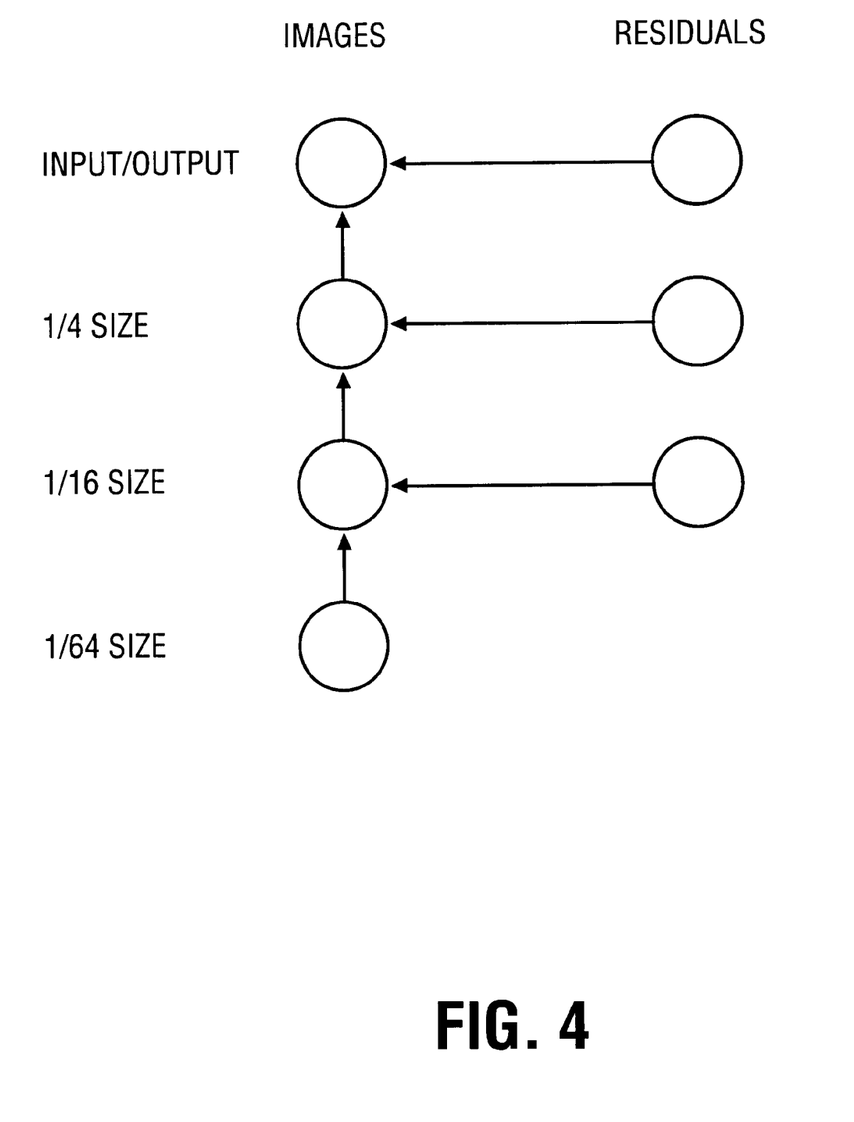
FIG. 4 shows an example of reconstruction dependencies for a 4-level pyramid decomposition.

Subband decoding is generally accomplished by an iterative technique where data from two leaf nodes is combined to reconstruct a parent node. This is illustrated in FIG. 3. Similarly, pyramid decoders begin with the anchor image, predict the next larger image, and add the residual error. This process is indicated in FIG. 4.

Subband and pyramid codes are generally thought of as fragile because errors may propagate from smaller to larger reconstruction images. The anchor image is especially vulnerable since this is where the most important reconstruction information is packed. Though subband wavelet coders are at risk, pyramid coders are especially subject to this frailty because they may use highly non-linear predictors.

SUMMARY OF THE INVENTION

A method and apparatus for robust encoded domain pixel decoding is disclosed. In one embodiment, robust encoded domain pixel decoding includes receiving transform domain coefficients, and identifying erroneous coefficients. Then, for each erroneous pixel resulting from erroneous coefficients, a virtual tap is determined. For each virtual tap, transform domain coefficient dependencies are determined. A filter to estimate a value for the erroneous pixel is determined using the corresponding transform domain coefficient dependencies.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for robust encoded domain pixel decoding is disclosed. In one embodiment, robust encoded domain pixel decoding includes receiving transform domain coefficients, and identifying an erroneous coefficient. Then, for each erroneous pixel resulting from an erroneous coefficient, a virtual tap is determined. For each virtual tap, transform domain coefficient dependencies are determined. A filter to estimate a value for the erroneous pixel is determined using the corresponding transform domain coefficient dependencies, which are identified as undamaged.

Robust encoded domain pixel decoding provides a method for reducing the frailty of pyramid coding techniques. An advantage of robust encoded domain pixel decoding is that all the information needed to reconstruct the full resolution image is present in the transform domain and so this resolution can be exploited when compensating for transmission errors.

Robust encoded domain pixel decoding further provides a robust method for decoding pixel data to minimize the effect of random coefficient loss in transform or pyramid coded structures. Unlike previous methods, robust encoded domain pixel decoding determines the least squares best estimate of a pixel, using only undamaged coefficients. A high resolution estimate is possible because data from all levels of the structures are utilized In the following descriptions, decompositions where the error-free reconstruction filters may be determined independently of the image data are discussed. Examples of decompositions that satisfy this constraint are the discrete wavelet transform (DWT) and pyramid coders with fixed prediction filters at each level.

Figure 5:
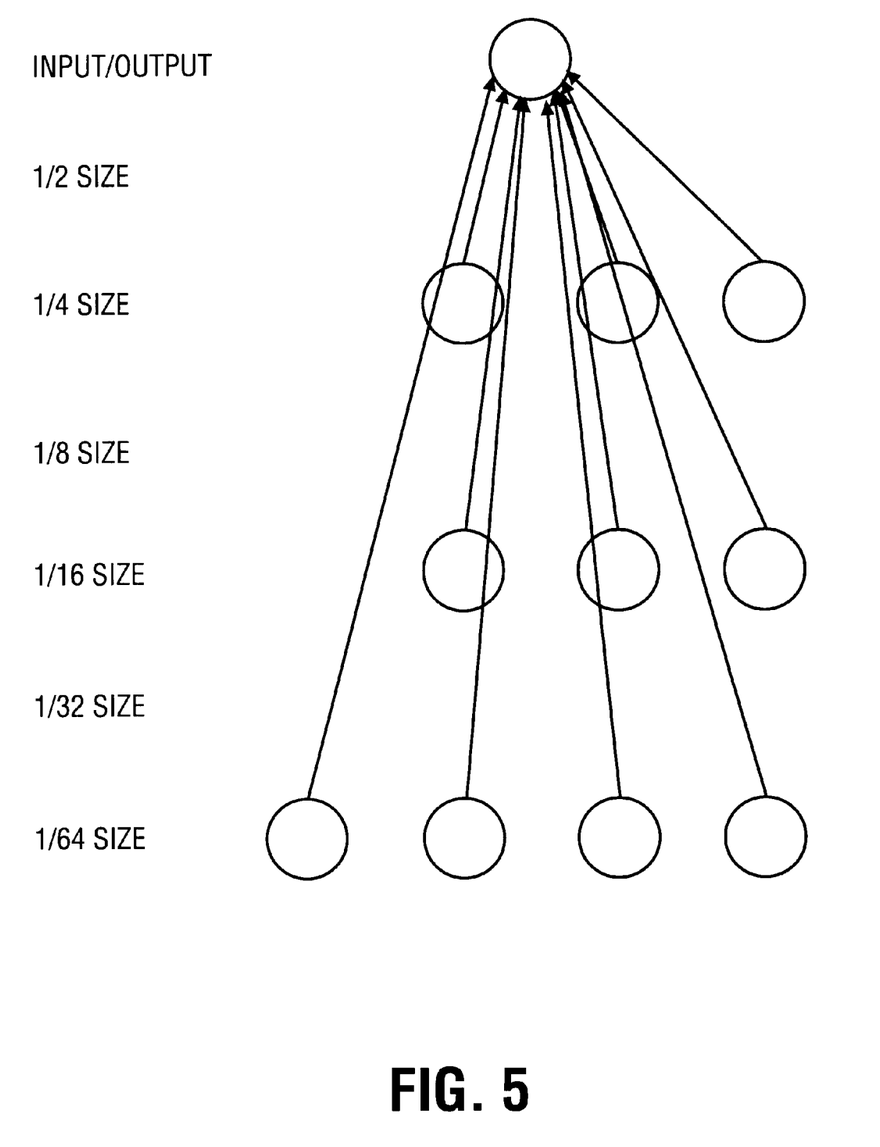
FIG. 5 shows an embodiment of direct reconstruction of an image from a 3-level subband decomposition.
Figure 6:
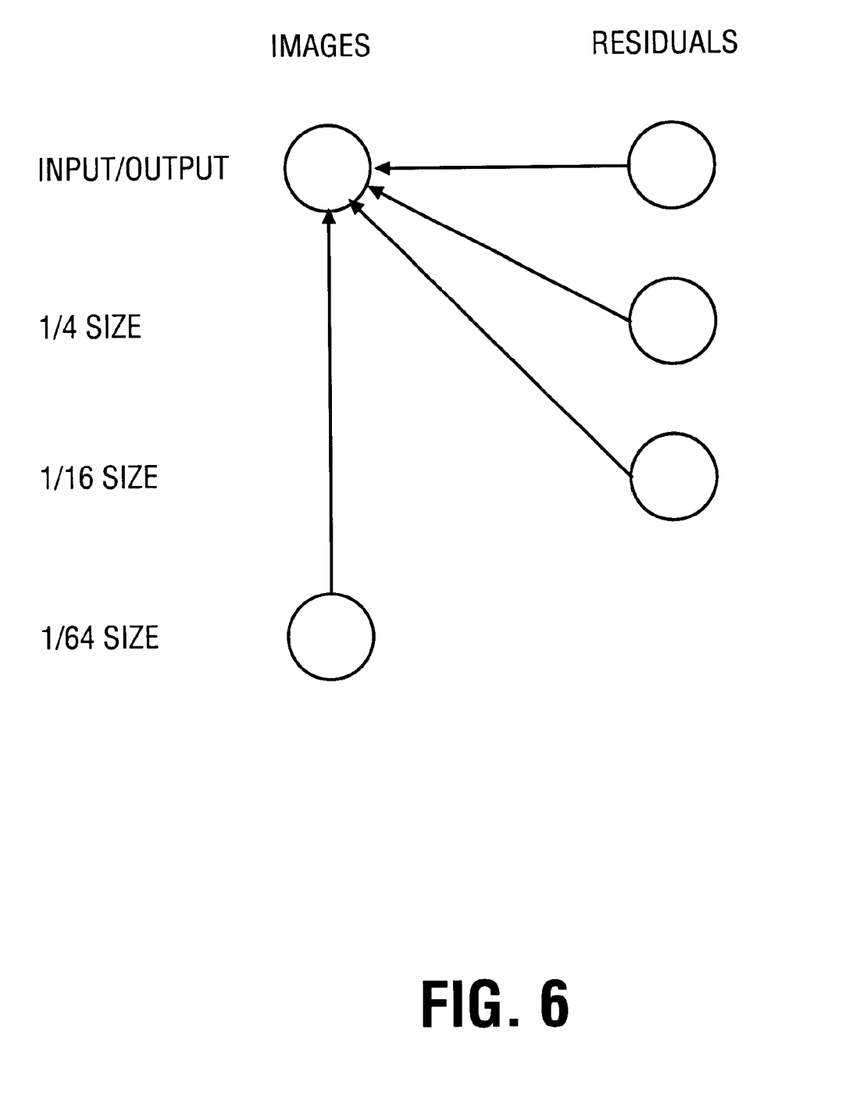
FIG. 6 shows an embodiment of direct reconstruction of an image from a 4-level pyramid decomposition.

Robust encoded domain pixel decoding forms "direct taps" by removing the intermediate layers of the reconstruction dependency graphs, as shown in FIGS. 5 and 6. The calculation of these direct taps is straightforward. A (1/N) size anchor image means that there are N reconstruction data "modes." A mode is defined by the geometric relation between the transform data and pixels of the reconstructed image. Each reconstruction data mode requires its own unique direct filter to reconstruct the data in the position defined by that mode. Thus, direct reconstruction of a 3-level subband decomposition requires 64 direct filters.

Each required filter is determined by working backwards through the standard dependency graphs of FIGS. 3 and 4. Knowledge of the standard reconstruction filters is also required. For example, to reconstruct a given pixel in the output image, all of a pixel's dependencies in its parent nodes are determined. If a dependency belongs to an intermediate node, it is removed by adding all of its dependencies. This process continues until no intermediate dependencies remain, as shown in FIGS. 5 and 6.

Figure 7:
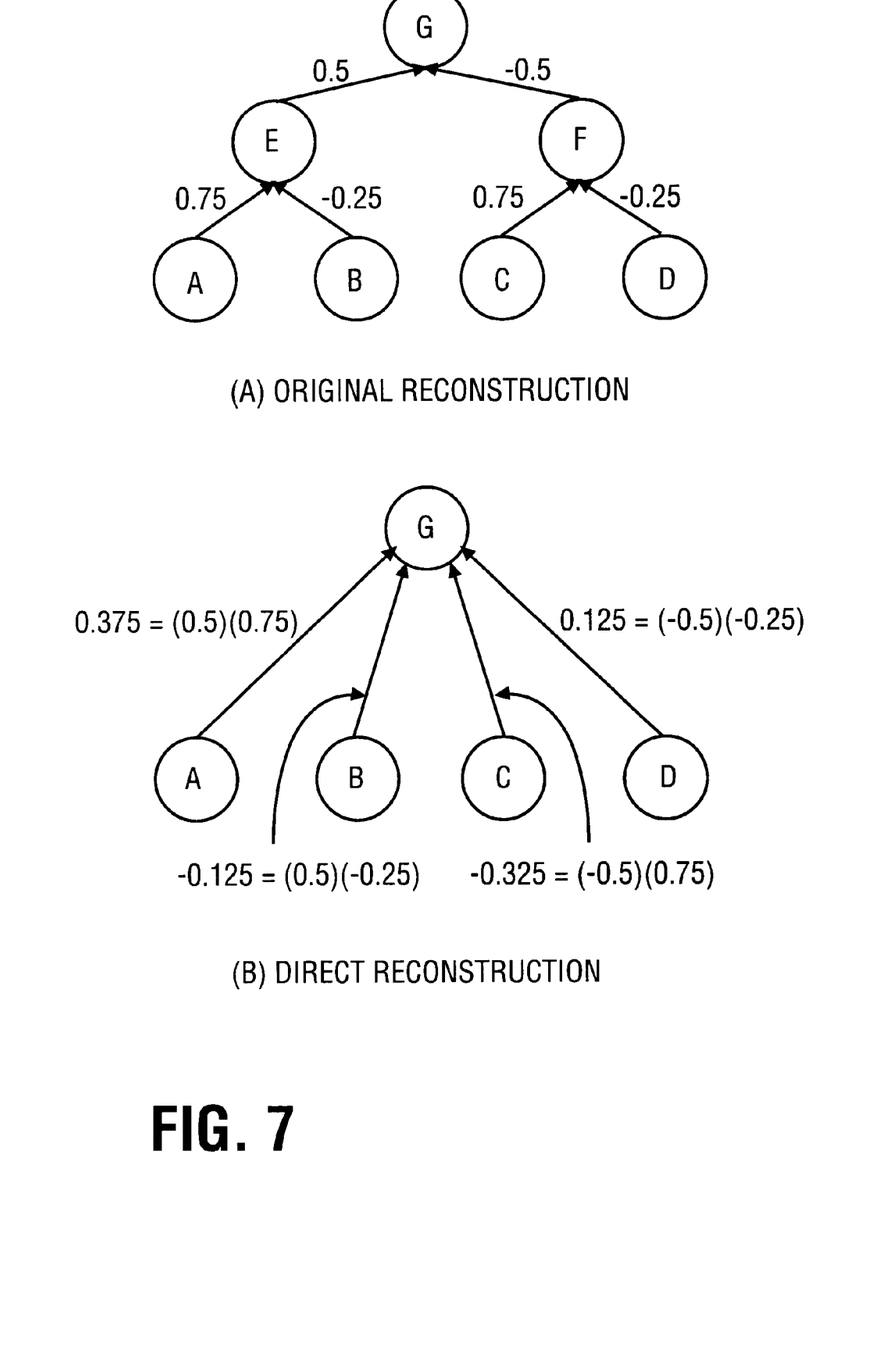
FIG. 7 shows an example of a method for forming a direct tap with corresponding (error-free) reconstruction filters.

In addition to determining a pixel's reconstruction dependency structure, the error-free direct reconstruction filter may be determined by keeping track of the magnitude of the usual (non-direct) reconstruction filter applied to each pixel. Each time an intermediate dependency is replaced, its replacements are scaled by the magnitude of the parent dependency, as shown in FIG. 7, for example.

Virtual Taps

One or more of the transform domain coefficient dependencies in the direct tap may be lost during transmission. In this case, the direct filter taps cannot adequately reconstruct the image. To improve this reconstruction, the available information used to decode all spatially surrounding pixels of a lost pixel is used to determine one or more filters to estimate the lost pixel data. This information may be provided by a virtual tap.

Figure 8:
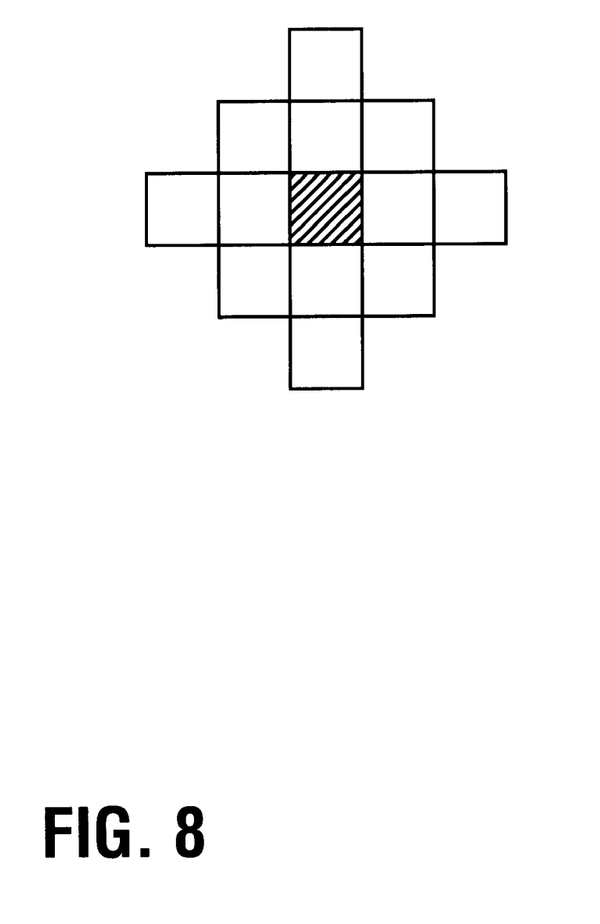
FIG. 8 shows an embodiment of a 13 pixel diamond tap in the spatial domain.
Figure 9:
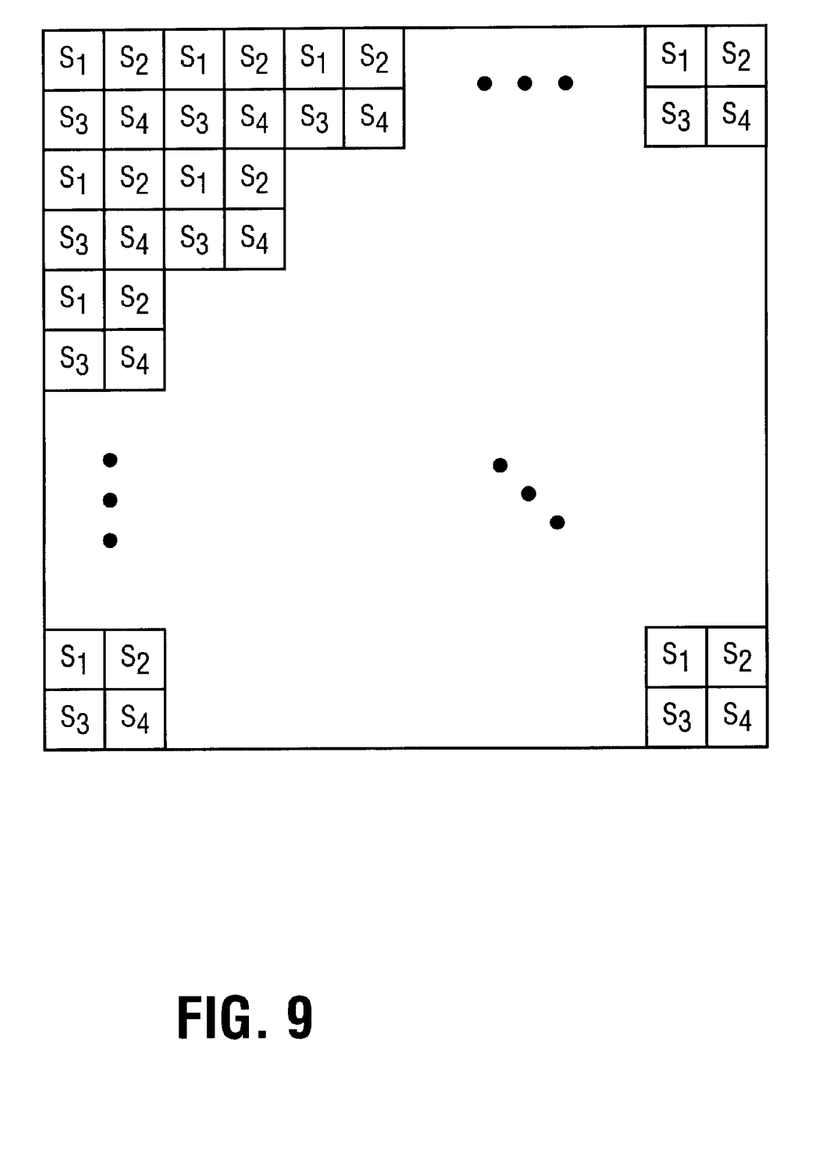
FIG. 9 shows an embodiment of a segmented image before encoding, we can ensure that spatially adjacent pixels have independent dependencies.

A virtual tap represents a spatial domain tap surrounding the lost pixel to be decoded and recovered. An example of a virtual tap is a 13-pixel "diamond" tap as shown in FIG. 8. The combined transform domain coefficient dependencies of the surrounding pixels in the virtual tap are useful for recovering the center pixel when one of the center pixel's transform domain coefficient dependencies has been lost or damaged. Segmenting the image as shown in FIG. 9, and encoding each segment separately, ensures that spatially adjacent pixels have independent transform domain coefficients.

Filter Weights

The optimal filter weight for each undamaged component of the virtual tap is calculated as the result of a least squares problem. The problem yields the optimal filter weights as determined by least squares training. Most of the training is done in advance to the system being built, but the final stage, which selects the undamaged transform domain coefficients to use, is done in real-time.

The process is as follows. For each mode, the transform domain coefficient dependencies of its virtual tap are determined. Several test images are processed. Each output pixel of each test image contributes one row of data to its corresponding training matrix $A_k$ where k indicates the output mode of the data. Similarly, the correct value of the output pixel contributes one row to the training vector $b_k$. In generally, the training process uses many output pixels, and so $A_k$ and $b_k$ contain a great number of rows.

The least squares optimal filter $x_k$ which best estimates $b_k$ given $A_k$ is determined. That is, $x_k$ is determined by solving the following minimization problem:

$$x_k = \min_x \|A_k x - b_k\|_2^2 \quad (1)$$

It is well known that the minimizer of Eq. (1) must also satisfy:

$$(A_k^T A_k) x_k = A_k^T b_k \quad (2)$$

and so $A_k^t A_k$ and $A_k^T b_k$ can be calculated and stored in a memory of a decoder, instead of $A_k$ and $b_k$, saving large amounts of memory.

The coefficients of $A_k^T A_k$ and $A_k^T b_k$, k=1, ... N, may be stored in a decoder's memory, such as ROM for example. However, the decoder must determine which of these data are valid for use when estimating a value for a damaged or lost pixel. No invalid data should contribute to the filter, $x_k$. This can be accomplished by a smart real-time decoder.

The one to one correspondence between columns of the training matrix, $A_k$, and the transform domain coefficient dependencies of the virtual taps, is stored by the decoder. A column of the training matrix that corresponds to an erroneous transform domain coefficient is removed from consideration. If the decoder solves for x using Eq. (2), instead of Eq. (1), then removing one or more columns of $A_k$ from Eq. (1) is equivalent to removing the corresponding column and row $A_k^T A_k$ and row of $A_k^T b_k$ in Eq. (2).

Figure 10:
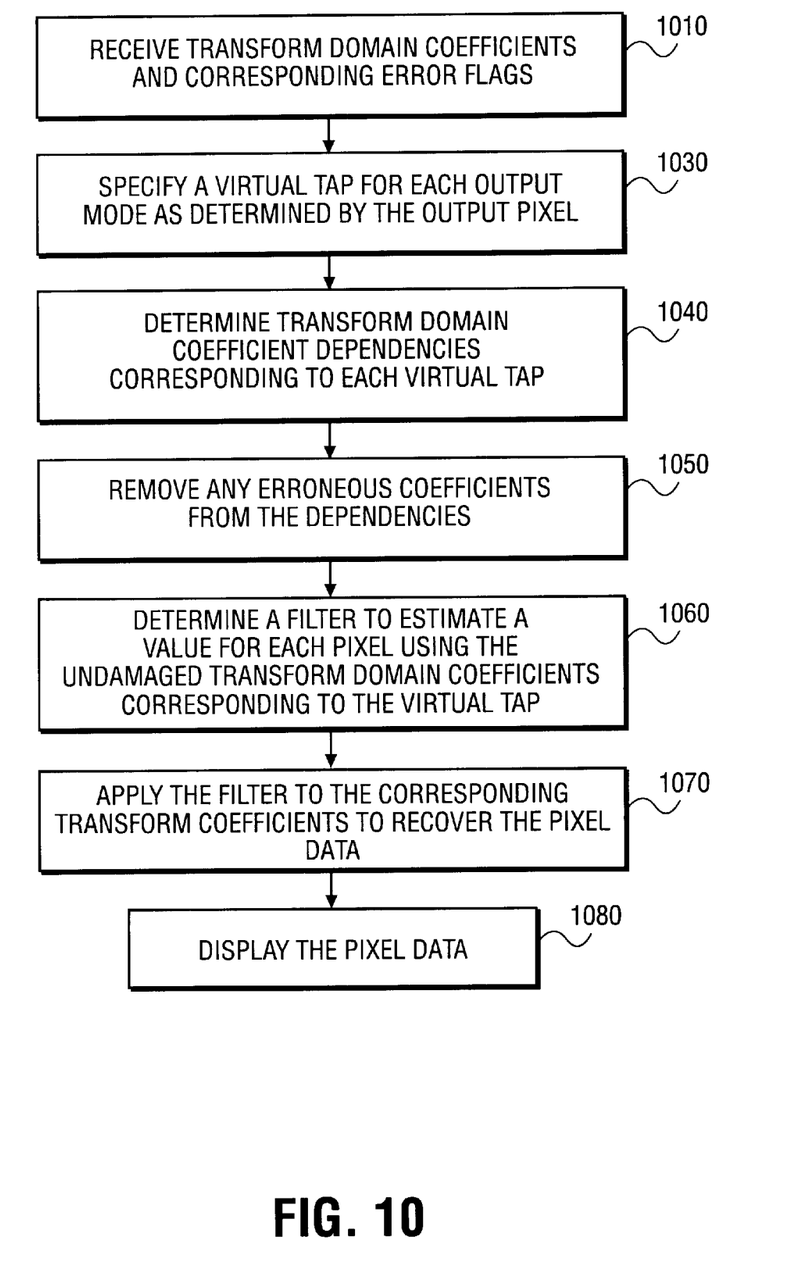
FIG. 10 shows an embodiment of a method for robust encoded domain pixel decoding.

A method for robust encoded domain pixel decoding is shown in FIG. 10. Transform domain coefficients are received by a decoder, 1010. Also, if any coefficients are erroneous, then error flags corresponding to the erroneous coefficients are also received by the decoder. A virtual tap for each output mode, as determined by the corresponding output pixel for the mode, is specified, 1030. The transform domain coefficient dependencies corresponding to each virtual tap are determined, 1040. Any erroneous coefficients are removed from the dependencies, 1050. A filter to estimate a value for each pixel is determined using the undamaged transform domain coefficient dependencies corresponding to the pixel's virtual tap, 1060. The filter may be determined by using the dependencies that optimally solve a least squares equation. The filter for each pixel is applied to the dependencies of the corresponding virtual tap, 1070, to recover the pixel data. The recovered pixel data is output to a display, where the recovered pixel is displayed, 1080.

The method shown in FIG. 10 may break down if the virtual tap depends on only the same few damaged data coefficients. Whether or not this happens is largely transform dependent. Transforms which can be implemented as block transforms (such as Haar wavelets) are especially prone. There are two methods of overcoming these difficulties.

The first method is to use a virtual tap which is large compared to the number of modes in consideration. In this way the dependency tree is sure to be derived from many anchor taps.

The second method is to use an encoder which segments the data into disjoint decompositions. In this way, spatially adjacent pixels have completely independent dependencies. An example of this technique to segment an image into four, as shown in FIG. 9. In this way, pixels spatially surrounding the pixel of interest are derived from 3 independent dependency paths.

Figure 11:
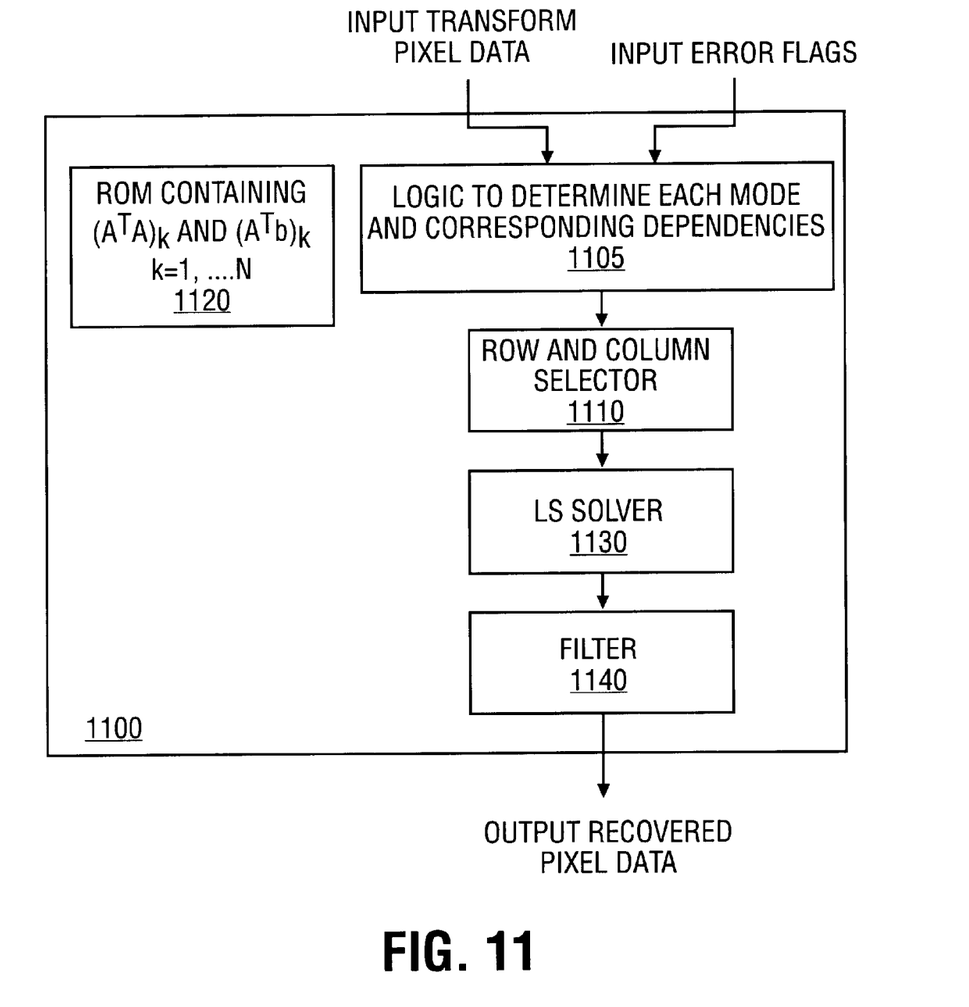
FIG. 11 shows an embodiment of a system to implement robust encoded domain pixel decoding.

An apparatus to perform robust encoded domain pixel decoding is shown in FIG. 11. Transform domain coefficients and corresponding error flags are received by decoder 1100 and input into logic 1105 to determine each mode and corresponding transform domain coefficient dependencies. The modes and corresponding dependencies are input into row and column selector 1110. Error flags that identify erroneous coefficients are also input into tap selector 1110. A virtual tap for an erroneous pixel is selected by row and column selector. Transform domain dependencies for the virtual tap are determined and input into selector 1110 from memory 1120. These dependencies are input into least squares solver 1130, which determines a filter for the erroneous pixel using the dependencies to solve a least squares problem. Filter 1140 is then applied to the dependencies to recover the pixel data.

Hardware Overview

Figure 12:
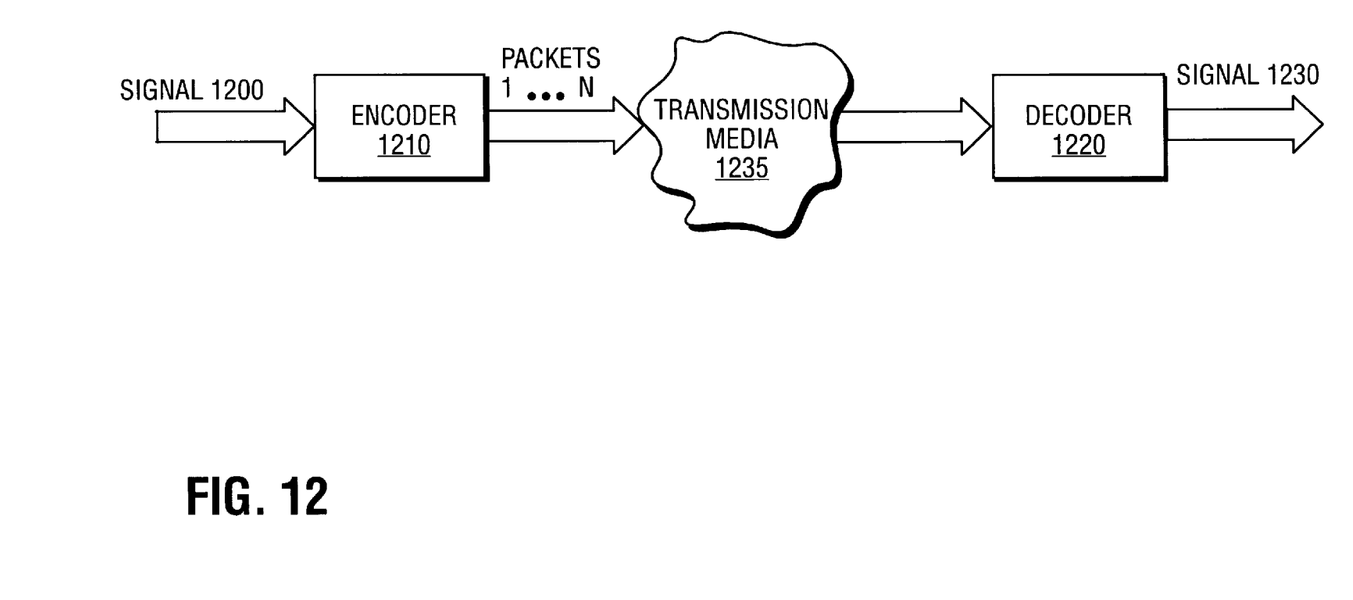
FIG. 12 shows an embodiment of a system to perform encoding and decoding, including robust encoded domain pixel decoding.

The signal encoding, transmission, and subsequent decoding are performed by the apparatus illustrated in FIG. 12. Signal 1200 is a data stream input to Encoder 1210. Encoder 1210 follows a compression algorithm. Encoder 1210 and Decoder 1220 can be implemented a variety of ways to perform the encoding and decoding functions. In one embodiment, Encoder 1210 and/or Decoder 1220 are embodied as software stored on media and executed by a general purpose or specifically configured computer system, typically including a central processing unit, memory and one or more input/output devices and co-processors. Alternatively, the Encoder 1210 and/or Decoder 1220 may be implemented as hardware logic circuits to perform these functions. In addition, Encoder 1210 and/or Decoder 1220 can be implemented as a combination of hardware, software or firmware. Furthermore, the decoder shown in FIG. 11 may be used to implement decoder 1220 shown in FIG. 12.

In one embodiment, Signal 1200 is a color video image having a sequence of video frames, each frame including information representative of an image for an interlaced video system. Each frame is composed of two fields, wherein one field contains data of the even lines of the image and the other field containing the odd lines of the image. The data includes pixel values which describe the color components of a corresponding location in the image. For example, in one embodiment, the color components consist of the luminance signal Y, and color difference signals U, and V. It is readily apparent the process of the present invention can be applied to signals other than interlaced video signals. Furthermore, it is apparent that the present invention is not limited to implementations in the Y, U, V color space, but can be applied to images represented in other color spaces.

Referring back to FIG. 12, Encoder 1210 divides the Y, U, and V signals and processes each group of signals independently in accordance with the compression algorithm. The following description, for purposes of simplifying the discussion, describes the processing of the Y signal; however, the encoding steps are replicated for the U and V signals.

In one embodiment, Encoder 1210 groups Y signals across two subsequent frames, referred to herein as a frame pair, of Signal 1200 into three dimensional blocks ("3D") blocks. For one embodiment, a 3D block is generated from grouping two 2D blocks from the same localized area across a given frame pair; wherein a two dimensional 2D block is created by grouping localized pixels within a frame or a field. It is contemplated that the process described herein can be applied to different block structures. The grouping of signals will be further described in the image-to-block mapping section below.

In one embodiment, a single frame includes 5280 2D blocks wherein each 2D block comprises 64 pixels. Thus, a frame pair includes 5280 3D blocks as a 2D block from a first frame and a 2D block from a subsequent frame are collected to form a 3D block.

A method and apparatus for robust encoded domain pixel decoding is disclosed. These and other embodiments of robust encoded domain pixel decoding may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method for robust encoded domain pixel decoding comprising:

receiving transform domain coefficients and corresponding error flags;

specifying a virtual tap surrounding each pixel;

determining transform domain coefficient dependencies corresponding to each virtual tap; and determining a filter to estimate a value for each pixel using the undamaged transform domain coefficients corresponding to the virtual tap.

2. The method of claim 1 further comprising:

applying the filter for each erroneous pixel to the corresponding virtual tap to estimate the pixel data.

3. The method of claim 2 further comprising:

outputting the estimated pixel data to a display and displaying the pixel.

4. The method of claim 1, wherein determining transform domain coefficient dependencies further comprises:

removing the erroneous coefficients from the dependencies.

5. The method of claim 1, wherein determining a filter further comprises:

using the dependencies to optimize a least squares equation.

6. An apparatus comprising:

means for receiving transform domain coefficients and corresponding error flags;

means for specifying a virtual tap surrounding each pixel;

means for determining transform domain coefficient dependencies corresponding to each virtual tap; and means for determining a filter to estimate a value for each pixel using the undamaged transform domain coefficients corresponding to the virtual tap.

7. The apparatus of claim 6 further comprising:

means for applying the filter for each erroneous pixel to the corresponding virtual tap to estimate the pixel data.

8. The apparatus of claim 7 further comprising:

means for displaying the pixel.

9. The apparatus of claim 6, wherein said means for determining transform domain coefficient dependencies further comprises:

means for removing the erroneous coefficient from the dependencies.

10. The apparatus of claim 6, wherein said means for determining a filter further comprises:

means for using the dependencies to optimize a least squares equation.

11. A computer readable medium having instructions which, when executed by a processing system, cause the system to:

receive transform domain coefficients and corresponding error flags;

specify a virtual tap surrounding each pixel;

determine transform domain coefficient dependencies corresponding to each virtual tap; and determine a filter to estimate a value for each pixel using the undamaged transform domain coefficients corresponding to the virtual tap.

12. The medium of claim 11 wherein the executed instructions further cause the system to:

apply the filter for each erroneous pixel to the corresponding virtual tap to estimate the pixel data.

13. The medium of claim 12 wherein the executed instructions further cause the system to:

output the estimated pixel data to a display and display the pixel.

14. The medium of claim 11, wherein the executed instructions further cause the system to:

remove the erroneous coefficient from the dependencies.

15. The medium of claim 11, wherein the executed instructions further cause the system to:

determine a filter by using the dependencies to optimize a least squares equation.

* * * * *